A. J. CHASE.

Assignor to A. W. BROWN, Trustee.

REFRIGERATOR WAGON.

No. 10,240. Reissued Nov. 14, 1882.

Witnesses.

Jas. E. Hutchinson.

J. A. Rutherford

Inventor.

Andrew J. Chase,

By his Attorney,

James L. Norris.

UNITED STATES PATENT OFFICE.

ANDREW J. CHASE, OF BOSTON, MASSACHUSETTS, ASSIGNOR TO ALBERT W. BROWN, TRUSTEE, OF SAME PLACE.

REFRIGERATOR-WAGON.

SPECIFICATION forming part of Reissued Letters Patent No. 10,240, dated November 14, 1882.

Original No. 263,285, dated August 22, 1882. Application for reissue filed October 23, 1882.

*To all whom it may concern:*

Be it known that I, ANDREW J. CHASE, a citizen of the United States, residing at Boston, in the county of Suffolk and State of Massachusetts, have invented new and useful Improvements in Refrigerator-Wagons, of which the following is a specification.

This invention relates to certain improvements in refrigerator-vehicles, which are especially adapted to the use of retail butchers and provision dealers.

My invention consists in combining with the body of a wagon a metallic vessel which is located transversely therein and vertically suspended from the deck or partition of the wagon, said vessel being composed of double walls to form vertical ice-receptacles, and a vertical air space or spaces open at each end for effecting circulation of air through the main compartment of the wagon without the air coming in contact with the refrigerating material.

Figure 1:
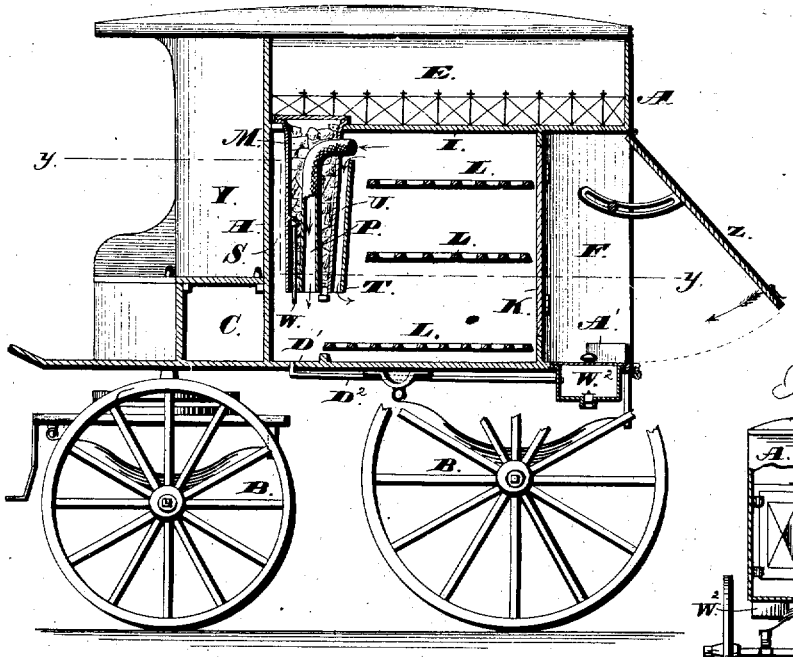
Figure 3:
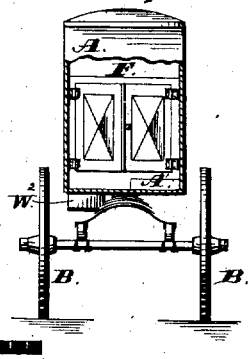
Figure 2:
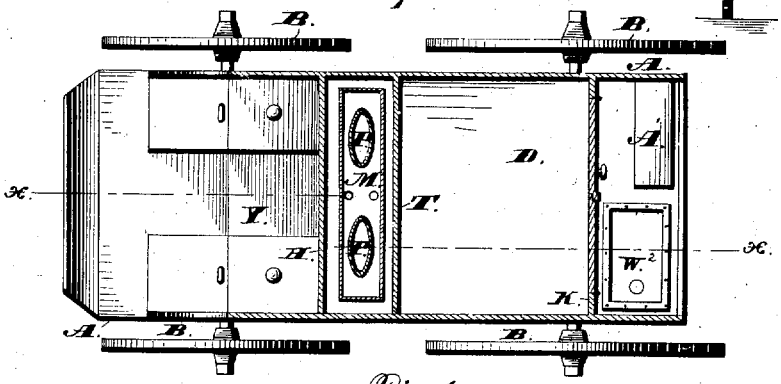
Figure 4:
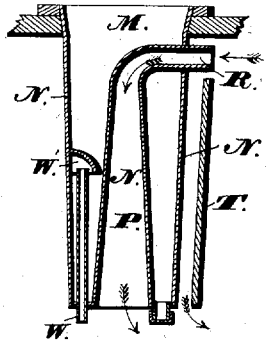

In the accompanying drawings, Figure 1 represents a side elevation of the vehicle with its side removed, showing the interior of the vehicle. Fig. 2 represents a horizontal section of the vehicle; Fig. 3, a rear view of the same, and Fig. 4 a detached vertical section of the refrigerating-chamber.

The letter A indicates the body of the vehicle, which is mounted upon wheels B, in the usual or any approved manner. The said body of the vehicle is divided into a series of compartments, C, D, E, and F, by means of suitable partitions, H, I, and K.

The letter D indicates the main compartment of the vehicle, in which the perishable articles are contained. This compartment is provided with a series of slatted shelves, L, on which the articles may be supported.

The letter M indicates the refrigerating-chamber. This consists of a metallic vessel located near the forward end of the main compartment D, and extending across the same, entirely or partially, as may be found convenient. The said chamber is formed with double walls N, leaving intermediate air-spaces, P, which open at their lower ends into the lower part of the main compartment D, and which communicate at their upper parts with said compartment by means of suitable passages, R, in such manner as to create a current of air through said compartment, as indicated by the arrows, when said refrigerating-chamber is filled with ice or other refrigerating material. Between the forward side of said chamber and the partition H is left a space, S, for the circulation of air, and just back of the rear wall of said chamber is located a partition, T, in such position as to leave an intervening space, U, for the circulation of air, as indicated by the arrows. The refrigerating-chamber is secured to the deck or partition I of the vehicle, and is open at the top and provided with a detachable cover for the introduction of ice or other refrigerating material. At the bottom the said chamber may be provided with a suitable opening or a pipe, by means of which the chamber may be emptied, and the chamber is provided with a drip-pipe, W, over which is secured a curved shelf, W′, to prevent dirt or ice from entering the pipe and choking it. The water drips into a chamber, D′, and may be discharged directly from the vehicle, or may be carried to and collected in a sink, $W^2$, at the rear, by means of a pipe, $D^2$, for the purpose of washing articles, when found necessary. The top of the central compartment forms a seat for the driver.

The letter Y indicates a recess above the driver's seat, which protects him from the sun and storms.

At the rear the vehicle is provided with a door, Z, which serves to close the compartment F, when required, and to form a protection to the dealer when distributing and dispensing the articles contained in the vehicle.

The forward compartment, C, may be provided with suitable doors at the front or any other convenient point, as also the upper compartment, E, for the insertion and removal of articles.

The operation of my invention will be readily understood in connection with the above description. All articles requiring refrigeration are placed in the main chamber, where they are subjected to a constantly-changing current of cold air established by means of a refrigerating-chamber. Vegetables and other articles which do not require refrigeration are placed in the forward compartment, or compartments C, the upper compartment, E, serving to contain baskets or parcels to be delivered as required.

In the compartment F is located a block, A′, upon which meats may be cut, and said compartment may also contain the scales, tools, and other implements required.

The main compartment D may be provided with doors at the sides or with doors leading into the rear compartment, by means of which articles may be inserted or removed.

The supplemental compartment above the refrigerator-compartment, adapted to receive material which it is not desired to refrigerate, with or without a compartment in the wagon adapted to be used for the cutting and trimming of meat, communicating with the refrigerating-compartment, has been long known and is not claimed herein.

Having thus described my invention, what I claim is—

1. In combination with the body of a wagon, a metallic vessel located transversely therein and vertically suspended from the deck or partition I of the wagon, said vessel being composed of the double walls N, to form vertical ice-receptacles, and a vertical air space or spaces, P, open at each end for effecting a circulation of air through the main compartment of the wagon without the air coming in contact with the refrigerating material, substantially as shown and described.

2. The combination, in a refrigerating-vehicle, of the main or refrigerating compartment and the refrigerating-chamber with the sink or receptacle $W^2$, arranged below the body of the vehicle for receiving the drippings from the ice-receptacle, substantially as described.

In testimony whereof I have hereunto set my hand in the presence of two subscribing witnesses.

ANDREW J. CHASE.

Witnesses:
EDWIN W. BROWN,
W. S. BELLOWS.